US00RE33958E

United States Patent [19]

Summerlin et al.

[11] E Patent Number: Re. 33,958

[45] Reissued Date of Patent: Jun. 16, 1992

[54] BREAKSTEM FASTENER INSTALLATION TOOL

[75] Inventors: Frederick A. Summerlin, Plymouth; James C. Hendry, Barford, both of England

[73] Assignee: Avdel Systems Limited, A British Company, Hertfordshire, England

[21] Appl. No.: 695,457

[22] Filed: May 3, 1991

Related U.S. Patent Documents

Reissue of:

[64] Patent No.: 4,924,691
Issued: May 15, 1990
Appl. No.: 314,777
Filed: Feb. 24, 1989

[30] Foreign Application Priority Data

Feb. 26, 1988 [GB] United Kingdom ..... 8804613

[51] Int. Cl.[5] ..... B21J 15/34

[52] U.S. Cl. ..... 29/243.523; 29/243.521; 72/453.17

[58] Field of Search ..... 29/243.521, 243.523, 29/243.525; 72/453.17

[56] References Cited

U.S. PATENT DOCUMENTS 2,525,626 10/1950 Stouffer .
3,088,618 6/1963 Pickford .
3,374,656 3/1968 Di Maio .
4,050,285 9/1977 Bosch et al. ..... 29/243.525
4,454,746 6/1984 Schwab ..... 29/243.525
4,815,310 3/1989 Summerlin et al. ..... 29/243.525

FOREIGN PATENT DOCUMENTS 2154788 5/1973 Fed. Rep. of Germany ..... 29/243.525

*Primary Examiner*—David Jones
*Attorney, Agent, or Firm*—Oblon, Spivak, McClelland, Maier & Neustadt

[57] ABSTRACT

A breakstem river installation tool includes a jaw mechanism (12) for gripping the stem of a rivet, and a pneumatically actuated piston and cylinder device (13) for applying pulling force to the jaw mechanism. It is provided with a damping valve (22) for damping the flow of air from the piston and cylinder device (13) when the force is suddenly released on breaking of a rivet stem (23), thereby to reduce mechanical shock to the tool, and noise of fast-escaping air. The damping valve (22) comprises a resilient steel circular disc (32) which is secured at its center to the apex of a domed member (28) provided with vent holes (26). The undeformed shape of the disc (32) is flat. When, in use of the tool, a rivet stem breaks and the restraining force on the piston (15) is released, the velocity of air flow past the disc (32) urges the disc to bend towards the domed surface of the member (28), thereby restricting the air flow through the vents (26). It may be that the valve closes completely, so that the peripheral edge (36) of the disc (32) contacts the annular valve seat (37) surrounding the air vents (26).

5 Claims, 4 Drawing Sheets

BREAKSTEM FASTENER INSTALLATION TOOL

Matter enclosed in heavy brackets [ ] appears in the original patent but forms no part of this reissue specification; matter printed in italics indicates the additions made by reissue.

BACKGROUND OF THE INVENTION

FIELD OF THE INVENTION

The invention relates to a breakstem fastener installation tool, more specifically, a tool for installing fasteners each having a stem, part of which stem breaks off on installation of the fastener. The fastener is installed by pulling on the fastener stem with respect to the fastener body, thereby deforming the body of the fastener. Increased pulling on the fastener stem causes the stem to break, leaving part of the stem plugging the body. Commonly the tool is pneumatically powered, with a pneumatically actuated piston and cylinder device for applying force to pulling means (e.g. stem-gripping jaws) for pulling the stem.

The fastener stem must be designed to break at a tension greater than that which is required to fully deform the fastener body; usually this is achieved by forming the stem with a weakened section or breakneck which will fracture at a predetermined tension. Typical values of fracture tension for small breakstem rivets are within the range of 500 lbs force to 1200 lbs force (2224 to 5338 Newtons).

When a fastener is being installed by a tool, the breaking of the fastener stem suddenly releases the resistance to the tension force generated within the tool by the pneumatic piston and cylinder device. This generates a substantial mechanical shock, and air-generated noise, in the tool, which is usually hand held.

The present invention seeks to reduce these effects.

SUMMARY OF THE INVENTION

The present invention provides, in one of its aspects, a breakstem fastener installation tool, which tool comprises:

pulling means for pulling the stem of a fastener;

a pneumatically actuated piston and cylinder device for applying force to the pulling means so as to pull the fastener stem;

and a damping valve for damping the flow of air from the piston and cylinder device when the force is suddenly released on breaking of a fastener stem, thereby to reduce mechanical shock to the tool when a fastener stem breaks.

The term [‘ampling’] *damping* is used to include both restricting the flow of air and shutting off completely the flow of air.

Further features of the invention will become apparent from the accompanying claims and description.

BRIEF DESCRIPTION OF THE DRAWINGS

A specific embodiment of the invention will now be described by way of example and with reference to the accompanying drawings, in which.

DESCRIPTION OF THE PREFERRED EMBODIMENT

Figure 1:
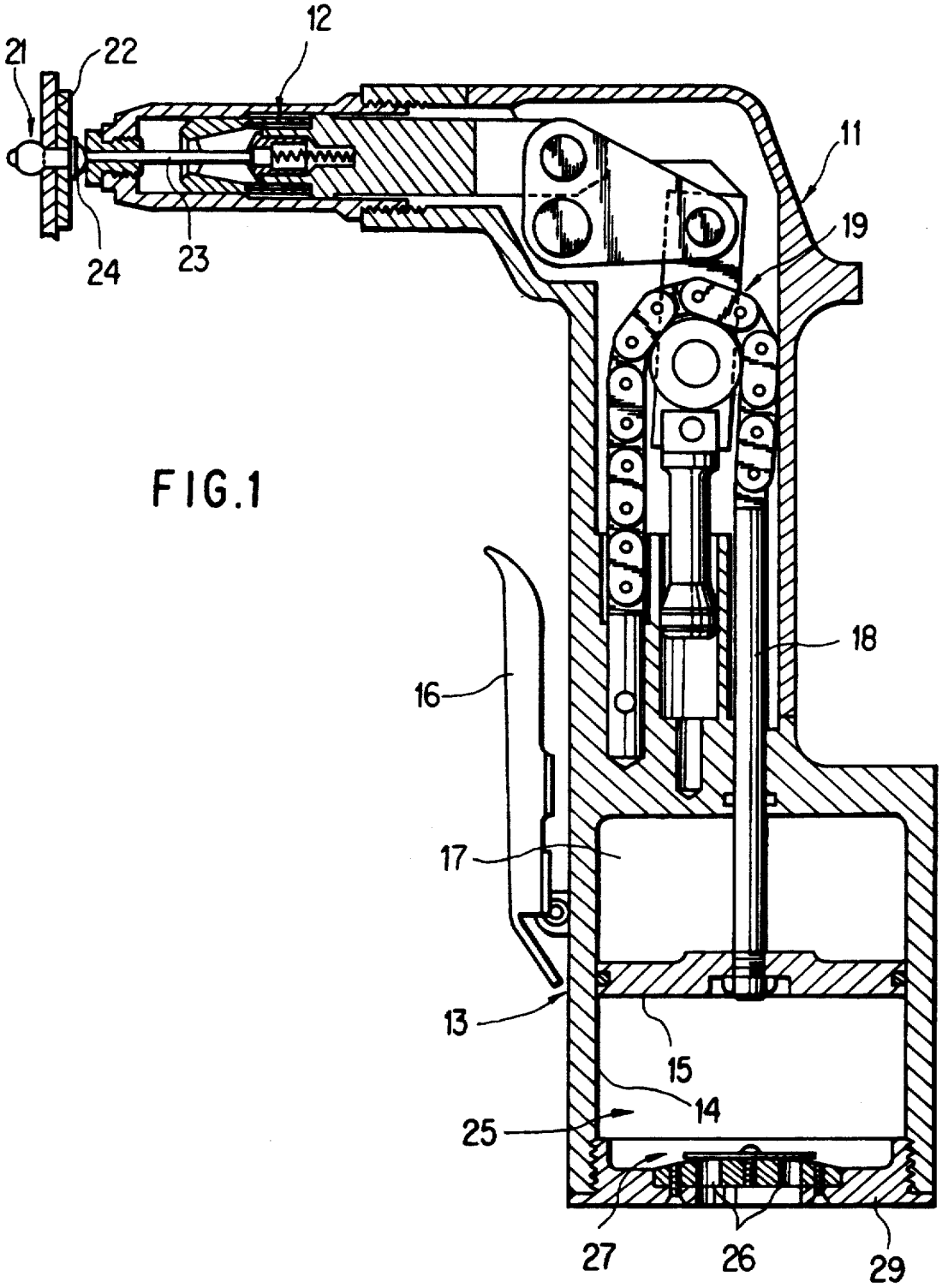
FIG. 1 is an axial cross-section through a hand-held pneumatically actuated tool for installing blind breakstem rivets.

[THe] *The* hand-held pneumatically-actuated tool shown in FIG. 1 comprises a body casting 11 incorporating pulling means in the form of a jaw mechanism 12, and a pneumatically actuated piston and cylinder device 13 for applying force to the jaw mechanism 12. The piston and cylinder device 13 comprises a cylinder 14 formed in the lower end of the casting 11, in which reciprocates a piston 15. When a trigger 16 is depressed, compressed air is fed (by means of a valve and conduits not shown) to the space or chamber 17 within the cylinder 14 above the piston 15. This applies downwards force to the piston 15, which force is transmitted to the jaw mechanism 12 by means of a piston rod 18 and a mechanical linkage 19. In use of the tool, a suitable breakstem rivet 21 to be installed in a workpiece 22 has is protruding stem 23 inserted within the jaw mechanism 12. When the tool is actuated, the jaw mechanism grips the stem 23 and applies a progressively increasing tension to it, with respect to the body 24 of the rivet. FIG. 1 illustrates the stage where the river body has been partially deformed into a blind head. Increase of the tension applied by the tool causes completion of deformation of the rivet body and subsequent fracture of the rivet stem at a breakneck (not visible in FIG. 1).

Breakstem rivets, and pneumatically actuated tools for placing them, are well known in the mechanical assembly industries.

When the rivet stem fractures, resistance to the force acting downwardly on the piston 15 is suddenly removed. The space 17 above is filled with air at a pressure approaching the supply line pressure, typically about 80 pounds per square inch (552 kilo Newtons per square meter or 5.3 bar). This pressure then accelerates the piston 15 downwardly with corresponding sudden movement of the mechanical linkage 19 and jaw mechanism 12. This results in mechanical shock to the tool when the piston hits the bottom of the cylinder, and therefore to the operator who is holding the tool in his hand, in the case of a prior art tool not provided with the valve of the present invention. A sharp noise also generated by the air in the space or chamber 25 below the piston being suddenly driven out through vent holes 26 in the base of the cylinder.

In order to reduce these unwelcome effects, the present invention provides a damping valve 27, to damp the flow of air from the space 25 of the piston and cylinder device 13 out through the vent holes 26. This provides resistance to the sudden movement of the piston 15 and the other parts of the tool as mentioned above. The construction of the valve is illustrated in FIGS. 2 and 3, and its manner of operation in FIGS. 4A, 4B and 4C.

The four vent holes 26 are provided in a circular insert 28 secured in the center of the base cap 29 of the cylinder 14. The upper surface 31 of the insert is convexly domed, being part-spherical in form. A resilient valve member, in the form of a flat circular disc 32 of thin springy steel, is mounted by means of a screw 34 on the insert at a mounting position 33 which is at the center of the disc 32 and also at the centre, and highest point, of the domed suface 31 of the insert 28. The underside of the disc 32 is spaced away from the highest point of the surface 31 by means of a spacer washer 35.

Figure 2:
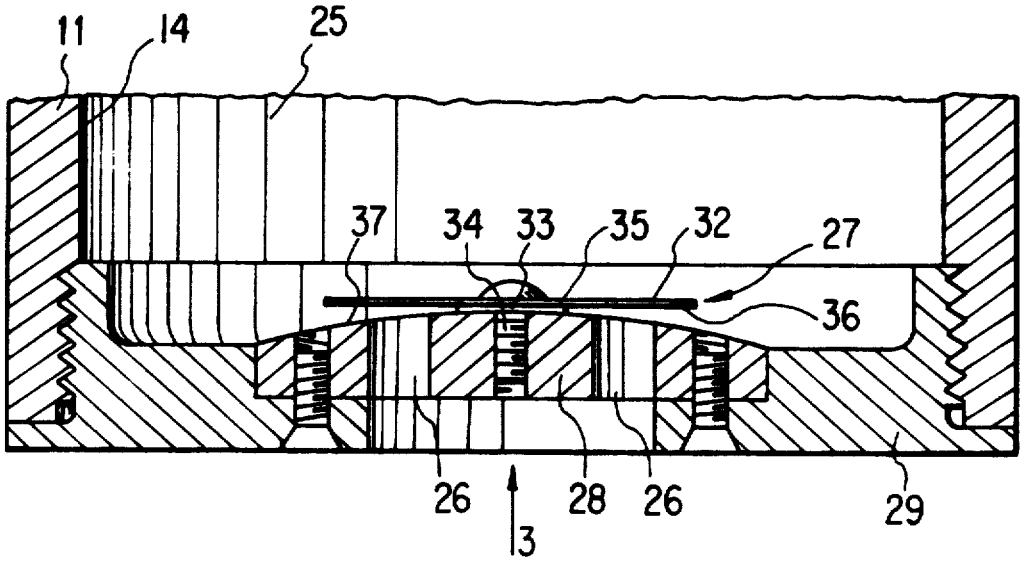
FIG. 2 is an enlargement of part of FIG. 1 showing the damping valve.
Figure 3:
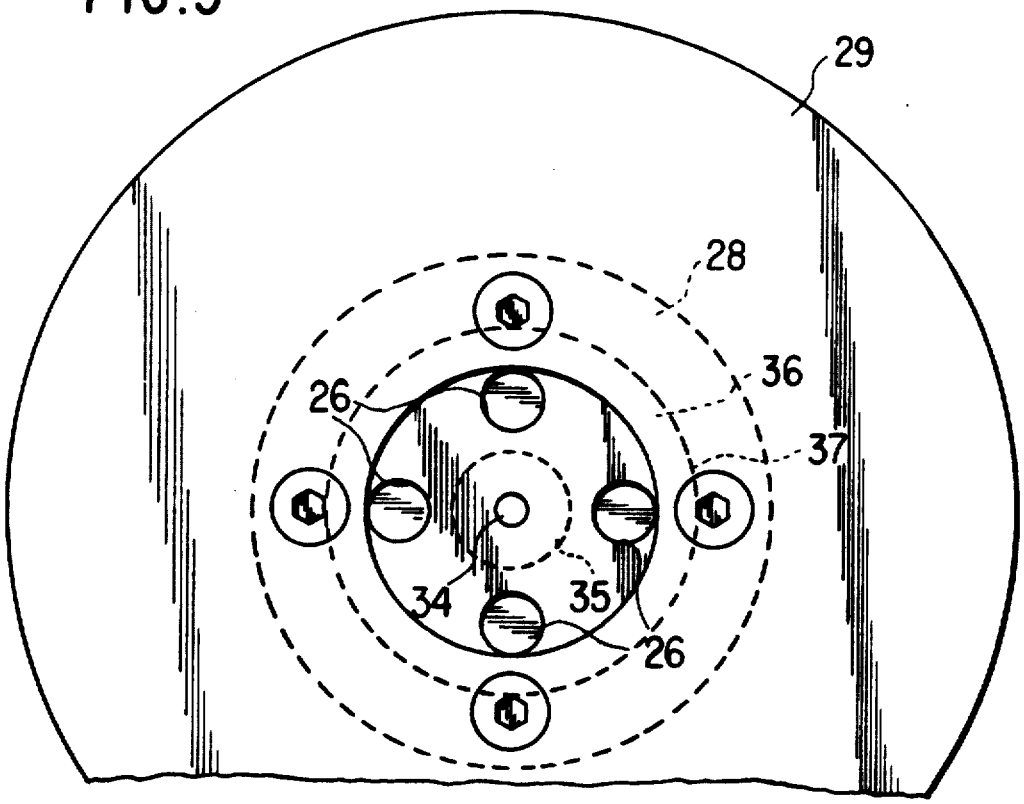
FIG. 3 is an underplan view in the direction of arrow 3 in FIG. 2.
Figure 4A:
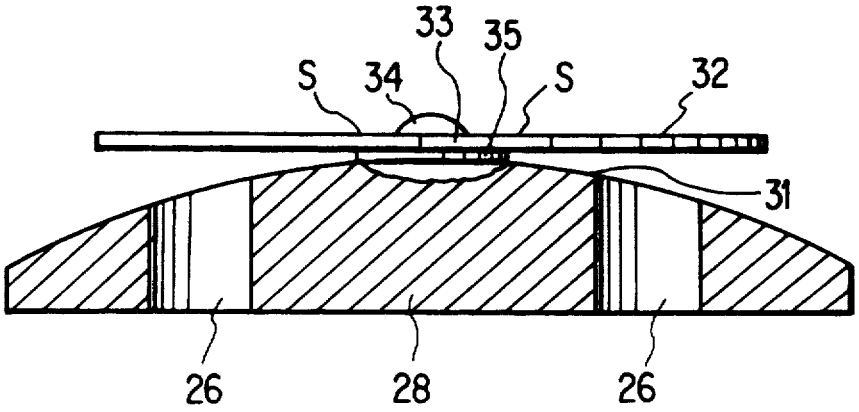
FIGS. 4A, 4 B and 4C schematically show progressive movement of the valve member of FIG. 2 from its open position to its closed position.
Figure 4B:
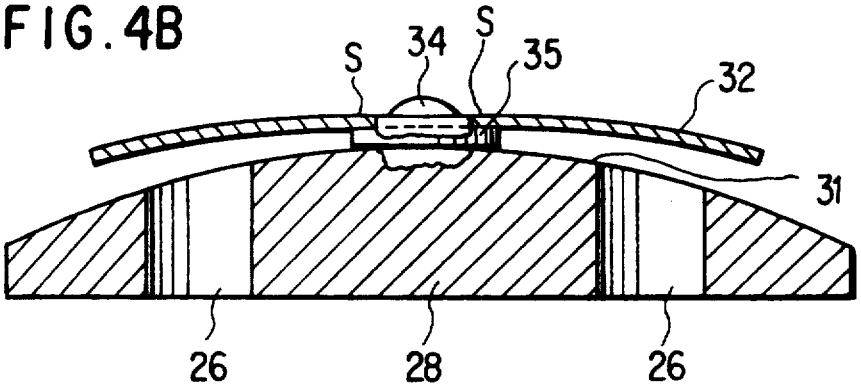
Figure 4C:
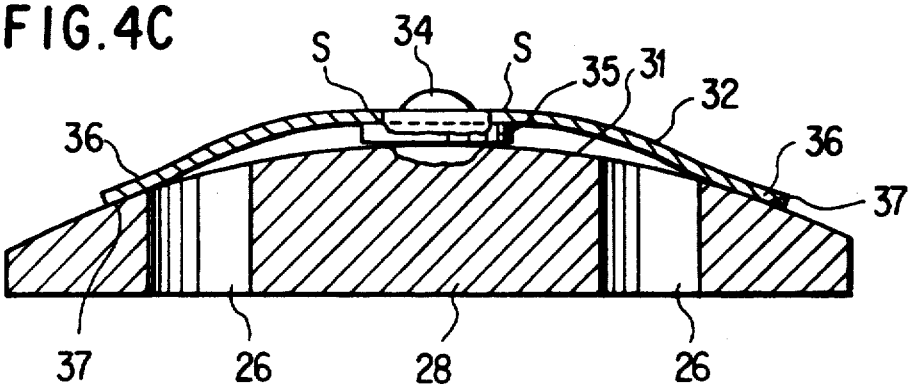

FIGS. 2 and 4A show the valve 27 in its open position, with the disc 32 in its undeformed of flat configuration. When sufficient air pressure is applied above the valve, the velocity of air flow across the underside of the peripheral part of the disc towards the vent holes 26 reduces the air pressure below the disc. The disc 32 is deformed by the air pressure difference across it, so that it bends against the biassing to its own resilience. FIG. 4B shows the disc 32 deformed part of the way between its open position and its closed position. As the air pressure difference across the disc 32 increases, the force on its upper face increases and it bends further, until its peripheral edge portion 36 abuts the annular portion 37 of the top surface 31 of the insert. This annular portion provides a seat for the valve member 32, which seat is radially outside the four vent holes 26, so that the valve is then in its closed position, as shown in FIG. 4C. It should be noted that the annular portion 37 of the surface 31, which provides the valve seat, is substantially parallel to the abutting edge portion 36 of the disc (as seen in diametral cross-section in FIG. 4C), thus providing enhanced sealing of the valve over mere line contact between the valve disc and valve seat.

It will be seen from FIGS. 4A, 4B and 4C that, when the valve member 32 moves from its open position to its closed position by the action of the air on it, no other part of the disc 32 meets any other part of the upper surface 31 of the insert or any other obstruction to its free movement, before the peripheral edge portion 36 of the disc 32 abuts the annular valve seat 37. The result is that the unsupported area of the disc, on which the air pressure acts to further deform the disc, remains undiminished, so that the effective force is not reduced. Furthermore the radially outermost supported position S of the disc 32, defined by the periphery of the spacer washer 35, does not change, so that the radius at which the effective force acts to produce a bending moment on the disc is not reduced. [Thsu] *Thus* the bending moment of the air pressure on the disc is not reduced as the disc deformation progressively increases. This unobstructed movement of the disc is due to the fact the mounting position 33 of the center of the disc 32 is displaced in the axial direction of the disc (i.e. generally transverse to the plane of the disc), above the adjacent surface 31 of the valve insert 28.

Figure 5A:
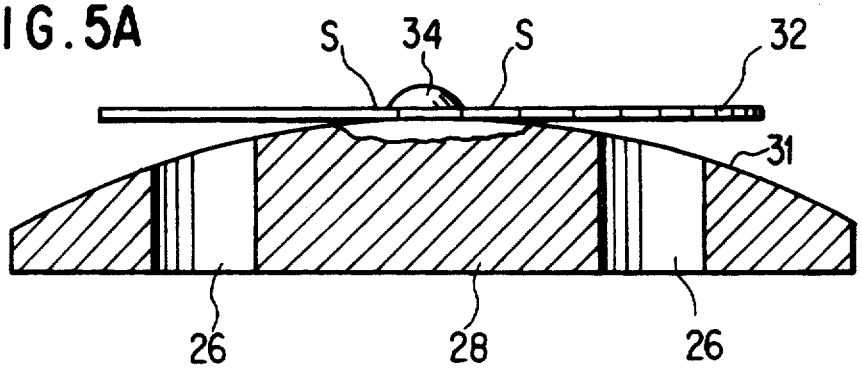
FIGS. 5A, 5B and 5C are similar but show schematically the action of a modified valve from which part has been omitted.
Figure 5B:
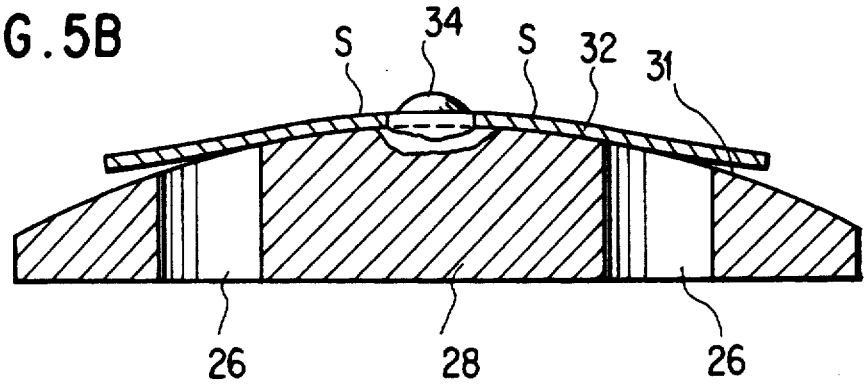
Figure 5C:
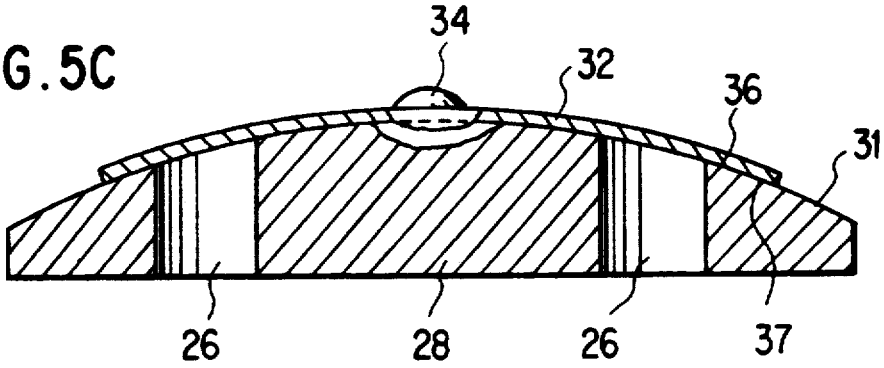

If this is were not present, i.e. if the spacer washer 35 is omitted, the valve has different characteristics as is illustrated in FIGS. 5A, 5B and 5C. It will be seen that, as the disc 32 progressively deforms toward the surface 31 of the insert 28, the underside of the disc comes into contact with the domed surface 31 at a position S which moves progressively radially outwardly. This has two disadvantageous effects. Firstly, the unsupported area of the disc, on which the air pressure above the disc can act to further deform the disc, progressively reduces so that the effective force on the disc progressively reduces. Secondly, the radially outermost supported position S on the disc progressively moves outwards, and the radius at which the effective force on the unsupported part of the disc acts progressively reduces. Thus the bending moment of the air pressure on the disc progressively reduces. On the other hand, the disc has to be deflected to a lesser extent, and should therefore close at a lower applied pressure difference across it. Also the narrower gap between the disc and the surface 31 increases the velocity of air flow under the disc, which reduces the pressure under the disc and increases the resultant pressure downwards on the disc.

Thus in case of the tool of this example fitted with either form of valve, when the rivet stem breaks and the piston 15 is suddenly free to move downwards under the urging of the air pressure above it, the air pressure thereby generated in the space 25 below the piston tends to move the valve 27 at least part way towards its closed position and, may close the valve completely. This has the effect of reducing or shutting off the flow of air through the vent holes 26, thus providing a damping or braking action on the movement of the piston 15 and connected parts of the tool. When the valve 27 closes completely, the piston 15 is progressively decellerated. In either case, the mechanical shock and air-generated noise are reduced.

When the stem has broken and the fastener has been placed, the operator releases the trigger, the air pressure is removed from the space 17 which is then vented, and the piston 15 moves upwardly under the urging of a return mechanism. The valve 27 reopens when the pressure inspace 25 drops, and the tool is ready for its next cycle of operation.

This invention is not restricted to the details of the foregoing example. For instance, the construction of the damping valve could be other than that described above.

We claim:

1. A breakstem fastener installation tool, which tool comprises:

pulling means for applying tension to a stem of a fastener to cause the breakage thereof;

a pneumatically actuated piston and cylinder device for actuating said pulling means so as to tension the fastener stem, said piston and cylinder device comprising a cylinder defining first and second chambers located on either side of said piston;

and a damping valve operatively connected to one of said chamber, said piston moving toward said one of said chambers when said piston and cylinder device actuates said pulling means so as to reduce the size of said one of said chambers, said damping valve comprising means for damping a flow of air from the piston and cylinder device and thereby applying resistance to the piston so as to restrict said movement of said piston towards said one of said chambers when the tension is suddenly released on breaking of said fastener stem, thereby to reduce mechanical shock to the tool when said fastener stem breaks;

*which damping valve is biased towards the open position but is moved, against the biasing, towards the closed position by the action on the valve of the air when a fastener stem breaks as aforesaid;*

*the damping valve comprising a valve member which valve member is resilient and is biased towards its open position by its own resilience;*

*the damping valve further comprising a valve seat, said valve member having at least one edge portion which is arranged to approach and then abut the valve seat when the valve member moves to its closed position;*

*the damping valve further comprising securing means for securing the valve member at a securing position thereon, which securing position is spaced away from said edge portion of the valve member, and is also*

*displaced away from the valve seat along a direction generally transverse to the direction along the valve member between the aforesaid edge portion and the aforesaid securing position.*

[2. A tool as claimed in claim 1, in which the damping valve is biassed towards the open position but is moved, against the biassing, towards the closed position by the action on the valve of the air when a fastener stem breaks as aforesaid.]

[3. A tool as claimed in claim 2, in which the valve member is resilient and is biassed towards its open position by its own resilience.]

[4. A tool as claimed in claim 3, in which the valve includes a valve seat, which at least one edge portion of the resilient valve member is arranged to approach and then abut when the valve member moves to its closed position, and securing means for securing the resilient valve member at a securing position thereon, which securing position is spaced away from the said edge portion of the valve member, and also displaced away from the valve seat along a direction generally transverse to the direction along the valve member between the aforesaid edge portion and mounting position.]

5. A tool as claimed in claim [4] *1*, in which the valve member is in the form of a circular disc having a peripheral edge portion as aforesaid and having the securing position at the center of the disc.

6. A tool as claimed in any of claims [3 to 5] *1 or 5*, in which the valve member is in the form of a substantially flat resilient disc, which is biassed as aforesaid towards a substantially flat configuration in the open position and is moved to a curved configuration in the closed position.

7. A tool as claimed in any of claims [3 to 5] *1 or 5*, in which the valve seat comprises a surface portion which is substantially parallel to the abutting edge portion of the resilient valve member as the latter approaches and abuts it.

8. A tool as claimed in claim [4] *1*, in which the arrangement is such that when the valve member moves from its open position to its closed position by the action of air on it as aforesaid, no other part of the valve member meets any other obstruction to its free movement, before the edge portion of the valve member abuts the valve seat as aforesaid.

* * * * *